United States Patent
Cowley et al.

(10) Patent No.: US 9,577,523 B2
(45) Date of Patent: *Feb. 21, 2017

(54) DUAL MODE VOLTAGE REGULATOR WITH RECONFIGURATION CAPABILITY

(75) Inventors: Nicholas P. Cowley, Wroughton (GB); Andrew D. Talbot, Chieveley (GB); Mark Mudd, Wiltshire (GB); Stephen J. Spinks, Swindon (GB); Keith Pinson, Swindon (GB); Colin L. Perry, Swindon (GB); Alan J. Martin, Plymouth (GB); Chi Man Kan, Swindon (GB); Matthew T. Aitken, Swindon (GB); William L. Barber, Bampton (GB); Isaac Ali, Berkshire (GB)

(73) Assignee: Intel Corporation, Santa Clara, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 13/997,306

(22) PCT Filed: Mar. 1, 2012

(86) PCT No.: PCT/US2012/027343
§ 371 (c)(1),
(2), (4) Date: Oct. 24, 2014

(87) PCT Pub. No.: WO2013/130088
PCT Pub. Date: Sep. 6, 2013

(65) Prior Publication Data
US 2015/0042295 A1    Feb. 12, 2015

(51) Int. Cl.
*H02M 3/158*    (2006.01)
*H02M 3/156*    (2006.01)
(Continued)

(52) U.S. Cl.
CPC ..... *H02M 3/158* (2013.01); *H02M 2001/0032* (2013.01); *H02M 2001/0045* (2013.01); *Y02B 70/16* (2013.01)

(58) Field of Classification Search
CPC ...... H02M 3/158; H02M 3/156; H02M 3/157; H02M 3/1588
(Continued)

(56) References Cited

U.S. PATENT DOCUMENTS 5,705,919 A * 1/1998 Wilcox ............... G05F 1/618
                                                      323/268
6,150,798 A    11/2000 Ferry et al.
(Continued)

FOREIGN PATENT DOCUMENTS

JP    2009-142097 A    6/2009
WO    2013095514       6/2013

OTHER PUBLICATIONS

International Search Report and Written Opinion received for PCT Application No. PCT/US2012/027343, mailed on Nov. 29, 2012, 12 Pages.
(Continued)

*Primary Examiner* — Timothy J Dole
*Assistant Examiner* — Sisay G Tiku
(74) *Attorney, Agent, or Firm* — Grossman, Tucker, Perreault & Pfleger, PLLC

(57) ABSTRACT

A dual mode voltage regulator according to one embodiment includes a passive regulator circuit, a switching regulator circuit, and a controller circuit configured to determine parameters of an external select input. The controller is configured to selectively couple, on a cold boot up, either the passive regulator circuit or the switching regulator circuit between an input voltage port and an output load based on the determination of parameters.

27 Claims, 6 Drawing Sheets

(51) Int. Cl.
  *H02M 3/157* (2006.01)
  *H02M 1/00* (2006.01)
(58) Field of Classification Search
  USPC .......................................... 323/224, 282–285
  See application file for complete search history.

(56) References Cited

U.S. PATENT DOCUMENTS

| | | | | |
|---|---|---|---|---|
| 6,229,289 | B1* | 5/2001 | Piovaccari | H02M 3/1588 323/268 |
| 7,148,670 | B2 | 12/2006 | Inn et al. | |
| 7,230,408 | B1* | 6/2007 | Vinn | H02M 3/156 323/273 |
| 7,782,027 | B2* | 8/2010 | Williams | H02M 3/07 323/266 |
| 7,830,128 | B2 | 11/2010 | Xu | |
| 8,890,493 | B2* | 11/2014 | Isik | H02M 3/07 307/66 |
| 2003/0085694 | A1 | 5/2003 | Lee | |
| 2004/0027099 | A1 | 2/2004 | Fujii | |
| 2007/0080673 | A1 | 4/2007 | Seliverstov | |
| 2009/0015215 | A1* | 1/2009 | Ajram | H02M 3/156 323/234 |
| 2009/0278517 | A1 | 11/2009 | Kleveland | |
| 2011/0148200 | A1* | 6/2011 | Burns | H02M 1/32 307/43 |
| 2015/0035507 | A1* | 2/2015 | Cowley | G05F 1/46 323/282 |
| 2015/0042300 | A1* | 2/2015 | Peker | H02M 3/156 323/274 |

OTHER PUBLICATIONS

International Search Report received for PCT Application No. PCT/US2012/066866, mailed on Sep. 3, 2012.
International Preliminary Report on Patentability and Written Opinion received for PCT Patent Application No. PCT/US2011/066866, mailed on Jul. 3, 2014, 8 pages.
International Preliminary Report on Patentability and Written Opinion received for PCT Patent Application No. PCT/US2012/027343, mailed on Sep. 12, 2014, 8 pages.

* cited by examiner

DUAL MODE VOLTAGE REGULATOR WITH RECONFIGURATION CAPABILITY

FIELD

The present disclosure relates to voltage regulators, and, more particularly, to a dual mode voltage regulator with reconfiguration capability.

BACKGROUND

System on a Chip (SoC) architectures often require multiple voltage sources (or voltage rails) to meet the variety of operational power requirements imposed by the numerous components in the system such as, for example, various input/output (I/O) sub-systems. Existing solutions typically implement voltage regulators on the platform or circuit board which hosts the SoC integrated circuit (IC). Some of these voltage regulators may be passive regulators while others may be switched mode regulators, depending on the requirements of the sub-system to be powered as well as the voltage available on the platform. This approach, however, consumes circuit board space and increases system complexity and power delivery cost. Additionally, voltage sources may be subject to change (rail voltage reduces) with time. Voltage sources may also vary depending on the sourcing of platform components. The potential for variability in voltage sources, including available line voltage, may limit the type of voltage regulator that can be implemented on the platform or circuit board hosting the SoC integrated circuit (IC).

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

By way of overview, the present disclosure is generally directed to methods and apparatus to provide dual mode voltage regulation with reconfiguration capability. The two modes may include a passive regulator mode and a switched regulator mode. An apparatus consistent with the present disclosure may be configured to operate in either mode (passive regulator mode or switched regulator mode) based on parameters of an external select input. The apparatus may include a controller circuit configured to receive a signal from an external select input and selectively couple either the passive regulator or the switched mode regulator between the input voltage port and the output load based on the signal upon a cold boot up of an SoC implementation to improve power conversion efficiency. In some embodiments, the passive regulator circuit may share components with the switched mode regulator circuit including, for example, a power switch and an error amplifier.

A dual mode regulator consistent with the present disclosure may be configured to provide the performance benefits of both a passive regulator and a switched regulator, thereby providing a means of overcoming issues related to changes in line voltage.

Figure 1:
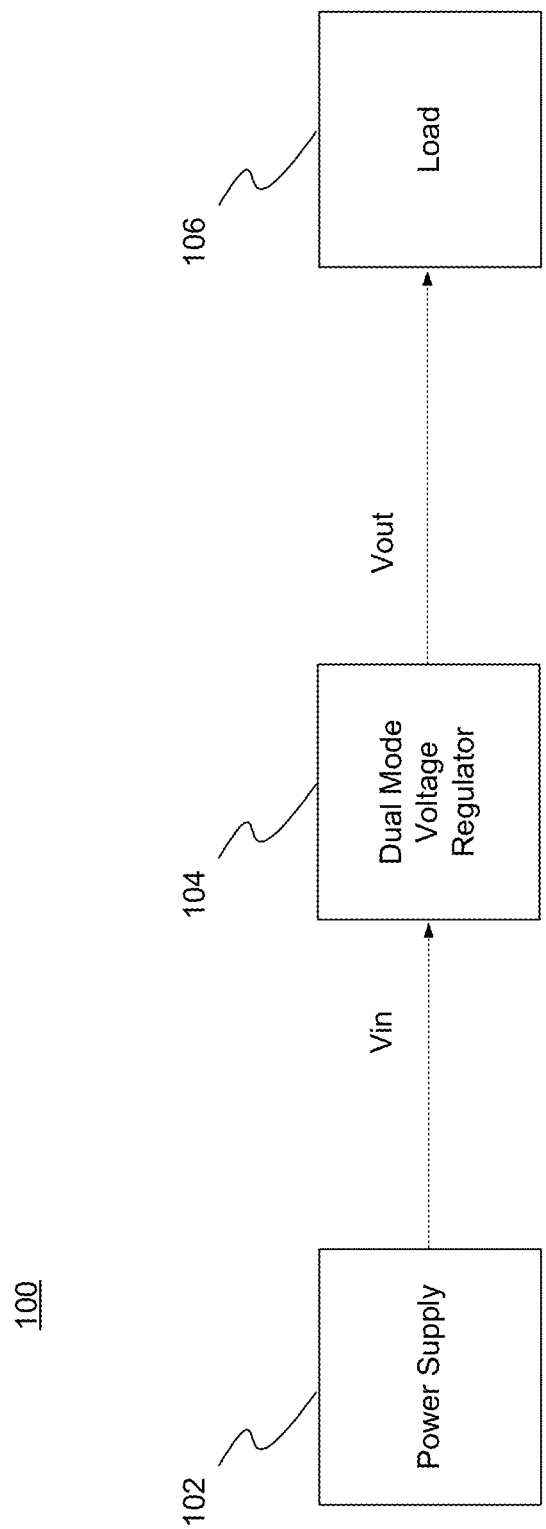
FIG. 1 is a top level system diagram of one exemplary embodiment consistent with the present disclosure.

FIG. 1 illustrates a top level system diagram 100 of one exemplary embodiment consistent with the present disclosure. A power supply 102 provides input power at a direct current (DC) voltage level to a dual mode voltage regulator 104. The dual mode voltage regulator 104 converts the input DC voltage level to an output voltage level that meets the requirements of load 106 and provides power to load 106 at that converted voltage level. In some embodiments, multiple dual mode voltage regulators 104 may be integrated with a System on a Chip (SoC) architecture where multiple components are integrated on an IC and present loads of varying voltage and power requirements. The multiple dual mode voltage regulator may operate from a common input voltage that is available to the SoC.

Figure 2:
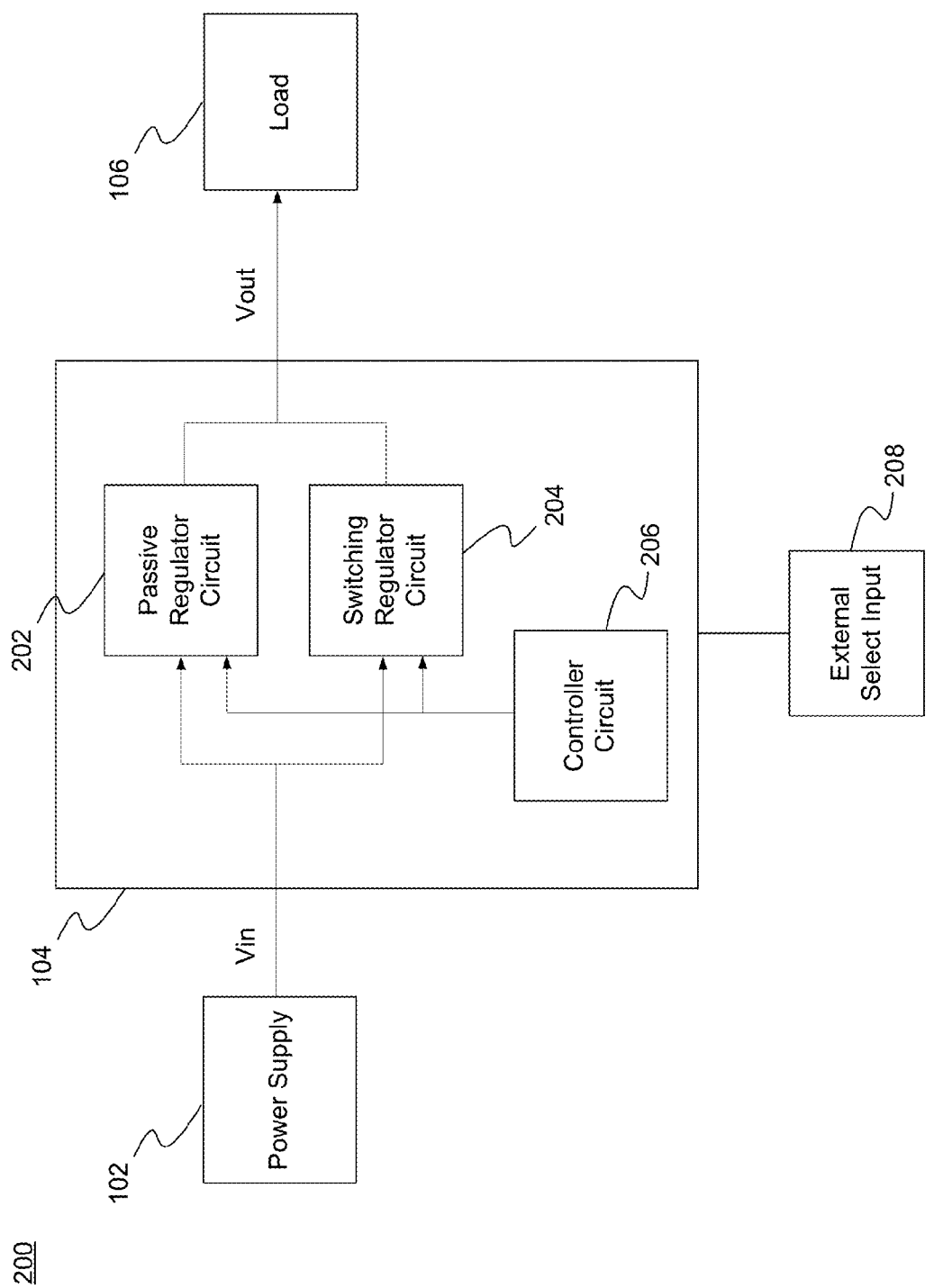
FIG. 2 is a system diagram of one exemplary embodiment consistent with the present disclosure.

FIG. 2 illustrates a system diagram 200 of one exemplary embodiment consistent with the present disclosure. In the illustrated embodiment, the dual mode voltage regulator 104 may include a controller circuit 206, a passive regulator circuit 202, and a switching regulator circuit 204. The controller circuit 206 may be configured to receive a signal from an external select input 208, as will be described in greater detail below, and selectively couple Vin to Vout through either passive regulator circuit 202 or switching regulator circuit 204 based on the signal.

The passive regulator circuit 202 may be a low drop-out (LDO) voltage regulator or other suitable passive voltage regulator. Passive voltage regulators generally operate by controlling current flow from the Vin port to the Vout port through a pass gate which may, for example, be a bipolar junction transistor (BJT) of a field effect transistor (FET). The gating signal for the pass gate may be derived from a differential amplifier (or error amplifier) that monitors the difference between Vout and a desired reference voltage Vref. Passive voltage regulators are typically capable of operating under conditions of reduced voltage differential between Vin and Vout, but they suffer from decreasing power conversion efficiency (the ratio of power out to power in) as the difference between Vin and Vout increases.

The switching regulator circuit 204 may be a buck voltage regulator or other suitable switching mode voltage regulator. Switching mode voltage regulators generally offer increased power conversion efficiency at higher load currents. Switching mode voltage regulators operate by switching current provided by the input power supply on and off at periodic intervals with a duty cycle (or pulse width modulation) that results in a desired voltage level conversion. For example, a 50 percent duty cycle may provide an output voltage to the load that is approximately one half of the input power supply line voltage. The pulse width modulated signal is typically processed by a filter at the output load, for example an inductor-capacitor network, to provide a DC output voltage waveform. The current switching may be performed by one or more switches, for example BJTs or FETs. The modulation rate or duty cycle may be dynamically adjusted by monitoring the difference between Vout and a desired reference voltage Vref. Although it may be possible to improve the power conversion efficiency of switching mode voltage regulators operating at reduced load currents, these techniques increase circuit complexity and cost.

Figure 3:
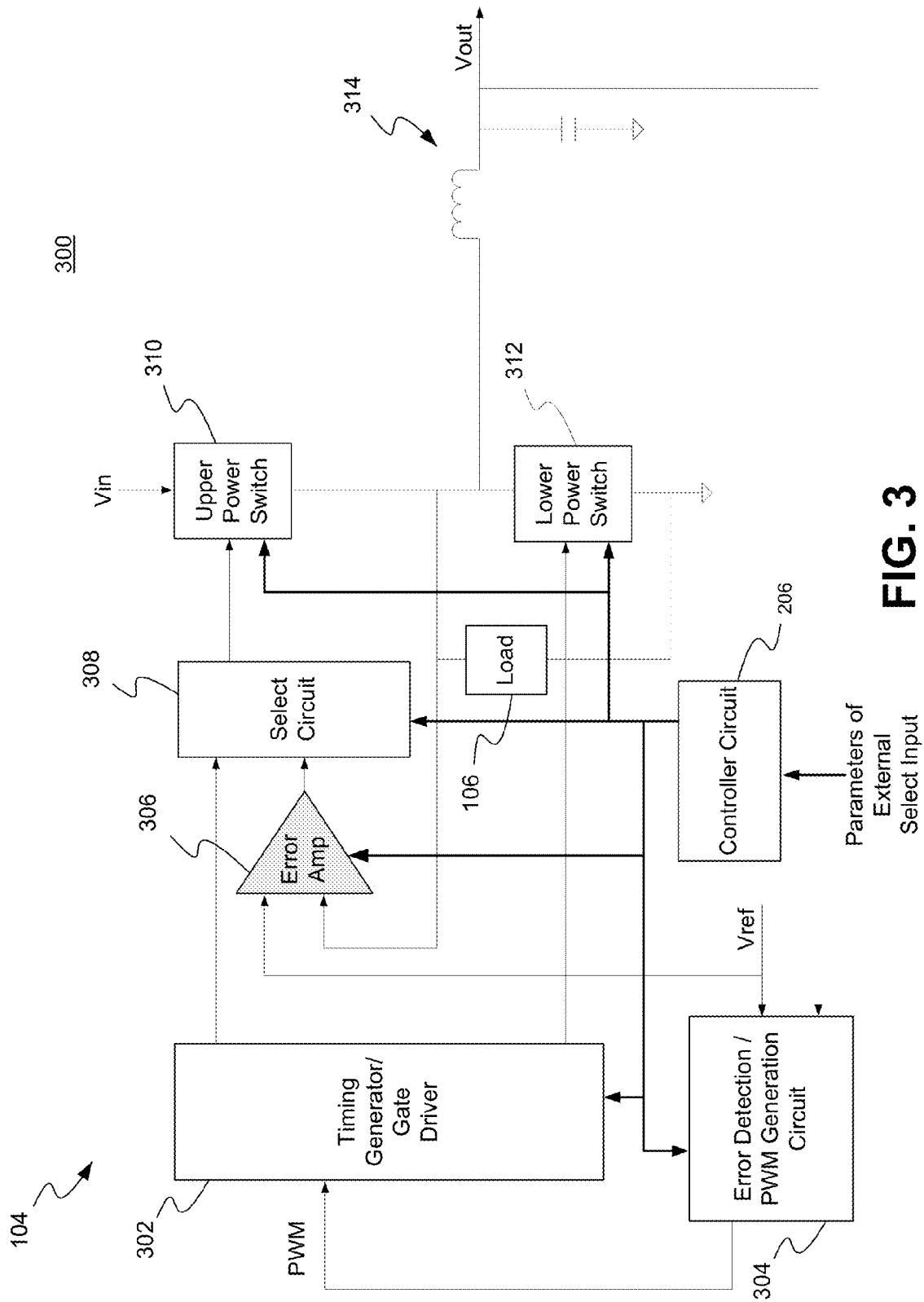
FIG. 3 is a more detailed block diagram of one exemplary embodiment consistent with the present disclosure.

FIG. 3 illustrates a more detailed block diagram 300 of one exemplary embodiment consistent with the present disclosure. The dual mode voltage regulator 104 is shown providing output voltage to load 106. The controller circuit 206 may be configured to receive a signal from the external select input 208. In one embodiment, the external select input 208 may include a hard-wired strap (i.e. an input connected to ground, connected to a common connector voltage Vcc, or the input may be floating). In other embodiments, the external select input 208 may include a controlling signal having basic functionality of, for example, an external system controller.

The signal from the external select input 208 may include parameters associated with the external select input 208, such as, for example, a voltage reference of the external select input 208, a ratio of the output voltage Vout to the input voltage Vin, and/or a load current. The controller circuit 206 is coupled to error detection/PWM generation circuit 304, timing generator/gate driver 302, error amplifier 306, selection circuit 308, and upper and lower power switches 310, 312, the operation of which will be explained in greater detail below. The error amplifier 306 provides feedback based on the difference between the converted output voltage and the desired output voltage as represented by a provided reference voltage Vref. The upper and lower power switches 310, 312 may be BJTs, FETs or other suitable types of power switches. The upper power switch 310 may also serve as a pass gate during passive (LDO) mode operation. An inductor-capacitor filter network 314, provided to smooth the output voltage, is also shown.

Figure 4:
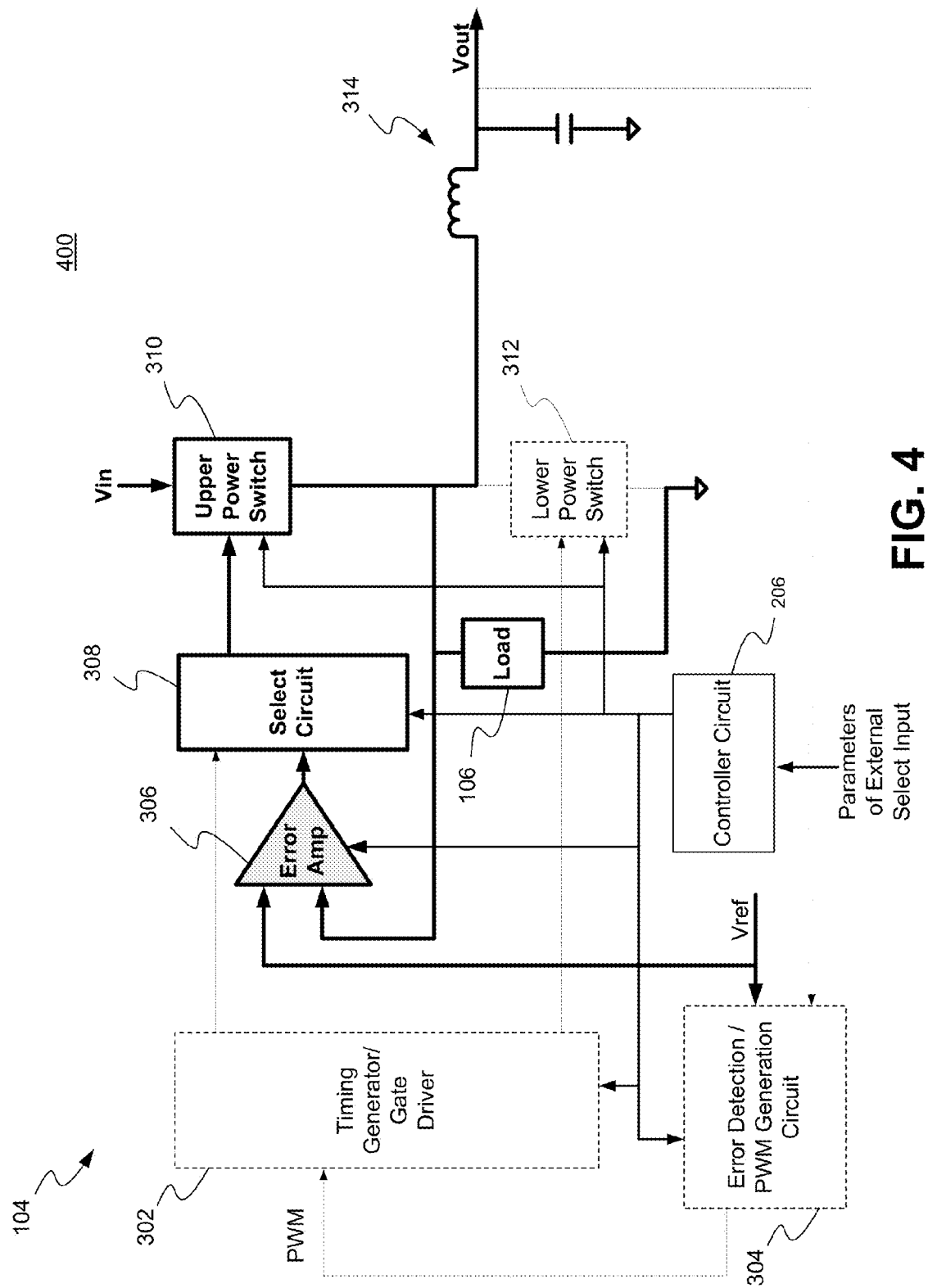
FIG. 4 is a more detailed block diagram illustrating a dual mode voltage regulator operating in a passive regulator mode consistent with the present disclosure.
Figure 5:
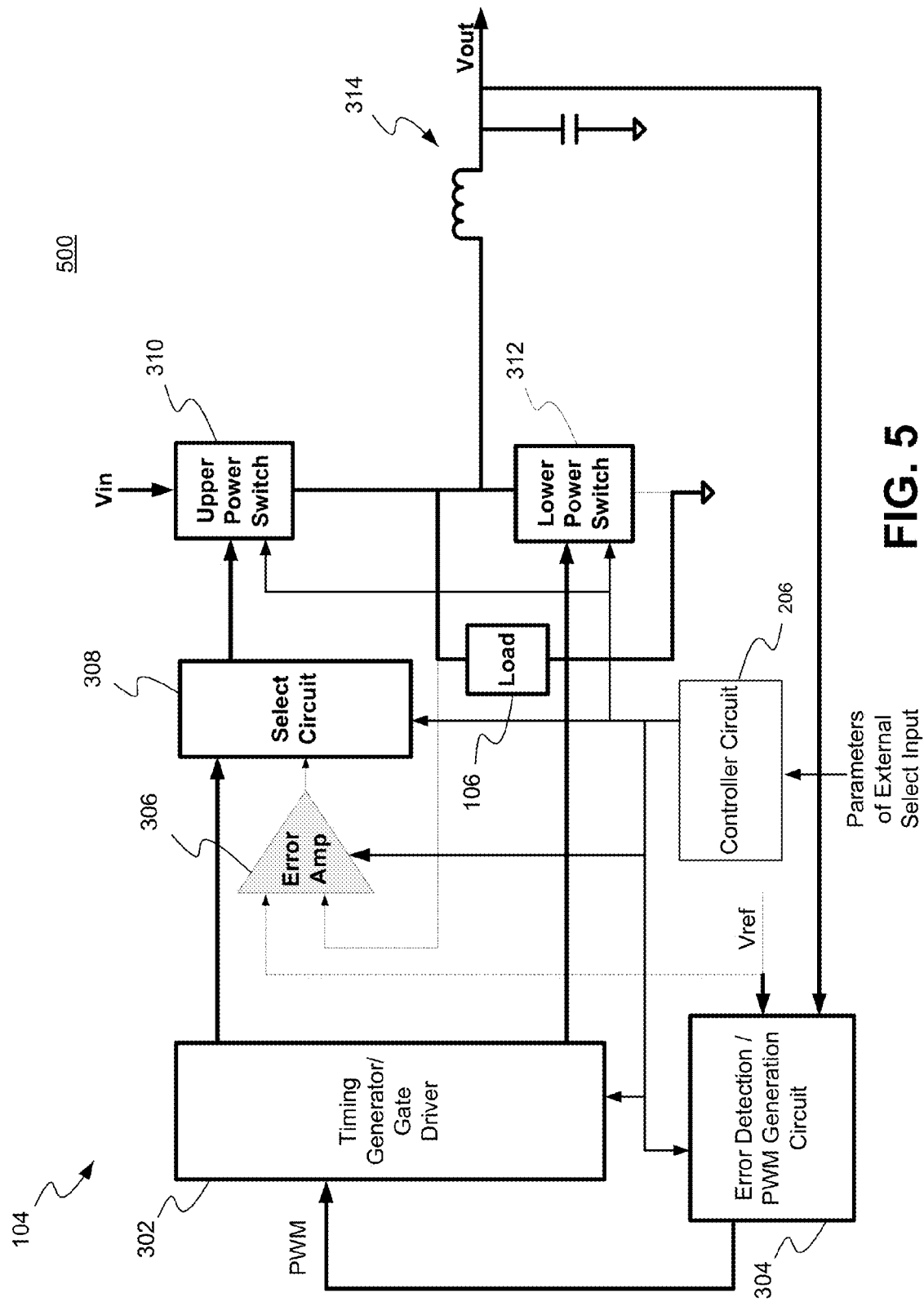
FIG. 5 is a more detailed block diagram illustrating a dual mode voltage regulator operating in a switched regulator mode consistent with the present disclosure.

As previously described, the controller circuit 206 may configure the dual mode voltage regulator 104 to operate in either an LDO (or passive) mode or a Buck (or switched) mode. FIGS. 4 and 5 are detailed block diagrams 400, 500 illustrating the dual mode voltage regulator 104 operating in an LDO (or passive) mode and Buck (or switched) mode, respectively. In particular, the control loops for each mode are illustrated in bold, wherein components and pathways not in use during either of the modes are in phantom. Upon receiving and determining parameters of the external selection input 208, the controller circuit 206 may advantageously configure the regulator 104 to operate in the mode best suited for the operating condition on a cold boot up of an SoC implementation.

For example, in the event that the parameters of the external select input 208 indicate that the load current is measured below a pre-determined threshold, the controller circuit 206 may configure the regulator 104 to operate in the LDO (or passive) mode rather than the Buck (or switched) mode. As another example, if the parameters of the external select input 208 indicate that the ratio of load voltage to input (or line) voltage is below a second pre-determined threshold, a higher power conversion efficiency may be obtained by configuring the regulator 104 to operate in the LDO mode rather than the Buck mode. In some embodiments, the controller circuit 206 may determine that a system clock is not present, as may occur during a system boot, in which case the controller may configure the regulator to operate in the LDO mode.

Additionally, the controller circuit 206 may configure the regulator 104 to operate in either the LDO or Buck modes based on a ratio of output voltage Vout to input voltage Vin. For example, in the event that the parameters of the external select input 208 indicate that the ratio of output voltage Vout to input voltage Vin is below a pre-determined threshold, the controller circuit 206 may configure the regulator 104 to operate in the Buck mode. As another example, in the event that the ratio of output voltage Vout to input voltage Vin is above a pre-determined threshold, the controller circuit 206 may configure the regulator 104 to operate in the LDO mode. Additionally, the controller circuit 206 may configure the regulator 104 to operate in either the LDO or Buck modes based on determining a predicted load current of the external select input 208. For example, in the event that the predicted load current of the external select input 208 is below a pre-determined threshold, the controller circuit 206 may configure the regulator 104 to operate in the LDO mode.

The error detection/PWM generation circuit 304 may be employed during Buck mode operation to compare the output voltage Vout to the reference voltage Vref and adjust the PWM to attempt compensate for any difference. The PWM signal may then be employed by the timing generator/gate driver circuit 302 to generate the timing signals corresponding to mark and space times that will drive the upper and lower power switches 310, 312. The selection circuit 308 determines, based on the current mode configuration, whether the signals from timing generator/gate driver circuit 302 will drive the power switches (in Buck mode) or whether the error amplifier 306 output will drive the upper power switch 310 as a pass gate (in LDO mode).

The controller circuit 206 may de-power some or all components that are exclusively associated with the mode that is not in use to reduce power dissipation. For example, as shown in FIG. 4, during operation in an LDO mode, the controller circuit 206 may be configured to de-power the error detection/PWM generation circuit 304, timing generator/gate driver 302, and/or lower power switch 312. Additionally, as shown in FIG. 5, during operation in a Buck mode, the controller circuit 206 may be configured to de-power the error amplifier 306. Some components may be shared between modes, however, such as, for example, the upper power switch 310 and the error amplifier 306.

In some embodiments, the controller circuit 206 may be configured to power up in LDO mode as a default, thus enabling power up in the absence of a system clock as may occur during a boot up of an SoC implementation.

It should be noted that, for the purposes of illustration, the control loops of the LDO and Buck modes of FIGS. 4 and 5, respectively, are shown independent. In some embodiments, some components, such as the error amplifier 306, may be redeployed between both modes, thereby reducing silicon overhead.

Figure 6:
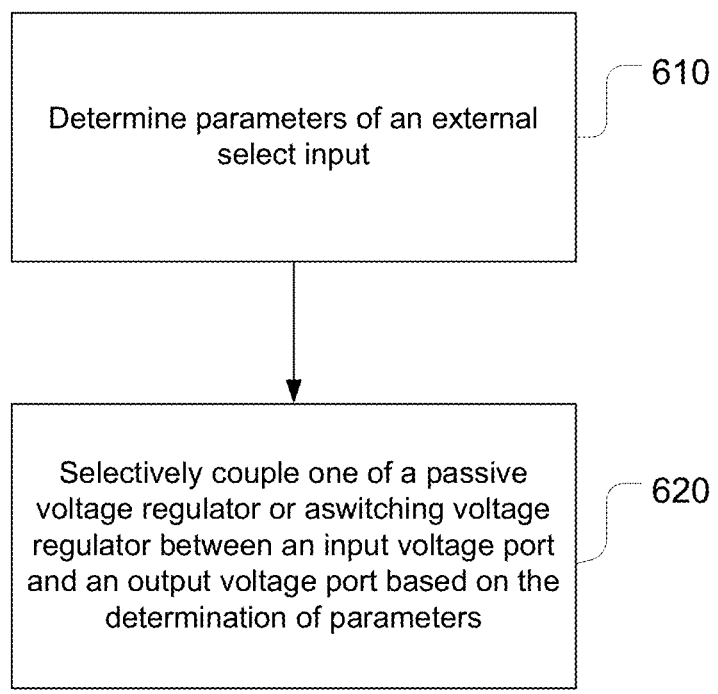
FIG. 6 is a flowchart of operations of one exemplary embodiment consistent with the present disclosure.

FIG. 6 illustrates a flowchart of operations 600 of one exemplary embodiment consistent with the present disclosure. At operation 610, parameters of an external select input are determined. The parameters may include, for example, a voltage reference of the external select input, a ratio of the output voltage Vout to the input voltage Vin, and/or a load current. At operation 620, one of a passive voltage regulator or a switching regulator is selectively coupled between an input voltage port and an output voltage port, based on the determining. In some embodiments components may be shared between the passive voltage regulator and the switching voltage regulator.

While FIG. 6 illustrates method operations according various embodiments, it is to be understood that in any embodiment not all of these operations are necessary. Indeed, it is fully contemplated herein that in other embodiments of the present disclosure, the operations depicted in FIG. 4 may be combined in a manner not specifically shown in any of the drawings, but still fully consistent with the present disclosure. Thus, claims directed to features and/or operations that are not exactly shown in one drawing are deemed within the scope and content of the present disclosure.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

"Circuitry", as used in any embodiment herein, may comprise, for example, singly or in any combination, hardwired circuitry, programmable circuitry, state machine circuitry, and/or firmware that stores instructions executed by programmable circuitry.

Certain embodiments described herein may be provided as a tangible machine-readable medium storing computer-executable instructions that, if executed by the computer, cause the computer to perform the methods and/or operations described herein. The tangible computer-readable medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The computer may include any suitable processing platform, device or system, computing platform, device or system and may be implemented using any suitable combination of hardware and/or software. The instructions may include any suitable type of code and may be implemented using any suitable programming language.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A dual mode voltage regulator, comprising:
   an input voltage port;
   an output voltage port;
   a passive regulator circuit;
   a switching regulator circuit; and
   a controller circuit to determine parameters of an external select input and selectively couple one of said passive regulator circuit and said switching regulator circuit between said input voltage port and said output voltage port, said selective coupling based on said determining of parameters, wherein said parameters include at least a ratio of a voltage at said output voltage port to a voltage at said input voltage port;
   wherein said controller circuit is further to couple said switching regulator circuit between said input voltage port and said output voltage port in response to determining that said ratio of said voltage at said output voltage port to said voltage at said input voltage port is below a second pre-determined threshold.

2. The dual mode voltage regulator of claim 1, wherein said switching regulator circuit comprises:
   an upper power switch coupled between said input voltage port and said output voltage port; and
   a lower power switch coupled between said output voltage port and a ground;

wherein said passive regulator circuit is to control a pass gate, said pass gate employing said upper power switch of said switching regulator.

3. The dual mode voltage regulator of claim 2, further comprising timing generation circuitry to provide a pulse width modulated (PWM) gating signal to said upper power switch and said lower power switch, and wherein a transition of said selective coupling is synchronized with said PWM gating signal.

4. The dual mode voltage regulator of claim 1, wherein said parameters include at least one of voltage at said input voltage port, voltage at said output voltage port, and current through a load coupled to said output voltage port.

5. The dual mode voltage regulator of claim 1, wherein said controller circuit is further to couple said switching regulator circuit between said input voltage port and said output voltage port in response to determining that a current through said load exceeds a first pre-determined threshold.

6. The dual mode voltage regulator of claim 5, wherein said controller circuit is further to couple said passive regulator circuit between said input voltage port and said output voltage port in response to determining that a current through said load is below said first pre-determined threshold.

7. The dual mode voltage regulator of claim 1, wherein said controller circuit is further to couple said passive regulator circuit between said input voltage port and said output voltage port in response to determining that said ratio exceeds said second pre-determined threshold.

8. The dual mode voltage regulator of claim 1, wherein said controller circuit is further to couple said passive regulator circuit between said input voltage port and said output voltage port in response to detecting the absence of a system clock signal.

9. The dual mode voltage regulator of claim 1, wherein said switching regulator circuit is a buck voltage regulator and said passive regulator circuit is as a low drop-out (LDO) voltage regulator.

10. The dual mode voltage regulator of claim 1, wherein, upon a cold boot up, said controller circuit is to selectively couple one of said passive regulator circuit and said switching regulator circuit between said input voltage port and said output voltage port.

11. A method for providing dual mode voltage regulation, said method comprising:
determining, by a controller circuit, parameters of an external select input;
selectively coupling, by said controller circuit, one of a passive voltage regulator and a switching voltage regulator between an input voltage port and an output voltage port, said selective coupling based on said determining of parameters, wherein said parameters include at least a ratio of a voltage at said output voltage port to a voltage at said input voltage port; and
coupling said switching voltage regulator between said input voltage port and said output voltage port in response to determining that said ratio of said voltage at said output voltage port to said voltage at said input voltage port is below a second pre-determined threshold.

12. The method of claim 11, wherein said parameters include at least one of voltage at said input voltage port, voltage at said output voltage port, and current through a load coupled to said output voltage port.

13. The method of claim 11, further comprising providing a switch that is operable as a power switch associated with said switching voltage regulator and as a pass gate associated with said passive voltage regulator.

14. The method of claim 13, further comprising generating a PWM gating signal to control said switch and transitioning said selective coupling in synchronization with said PWM gating signal.

15. The method of claim 11, further comprising coupling said switching voltage regulator between said input voltage port and said output voltage port in response to determining that a current through a load coupled to said output voltage port exceeds a first pre-determined threshold.

16. The method of claim 15, further comprising coupling said passive voltage regulator between said input voltage port and said output voltage port in response to determining that a current through a load coupled to said output voltage port is below said first pre-determined threshold.

17. The method of claim 11, further comprising coupling said passive voltage regulator between said input voltage port and said output voltage port in response to determining that said ratio exceeds said second pre-determined threshold.

18. The method of claim 11, further comprising coupling said passive voltage regulator between said input voltage port and said output voltage port in response to detecting the absence of a system clock signal.

19. The method of claim 11, further comprising selectively coupling, by said controller circuit, one of said passive regulator circuit and said switching regulator circuit between said input voltage port and said output voltage port upon a cold boot up.

20. A non-transitory computer-readable storage medium having instructions stored thereon which when executed by a processor result in the following operations for providing dual mode voltage regulation, said operations comprising:
determining, by a controller circuit, parameters of an external select input;
selectively coupling, by said controller circuit, one of a passive voltage regulator and a switching voltage regulator between an input voltage port and an output voltage port, said selective coupling based on said determining of parameters, wherein said parameters include at least a ratio of a voltage at said output voltage port to a voltage at said input voltage port; and
coupling said switching voltage regulator between said input voltage port and said output voltage port in response to determining that said ratio of said voltage at said output voltage port to said voltage at said input voltage port is below a second pre-determined threshold.

21. The non-transitory computer-readable storage medium of claim 20, wherein said parameters include at least one of voltage at said input voltage port, voltage at said output voltage port, and current through a load coupled to said output voltage port.

22. The non-transitory computer-readable storage medium of claim 20, wherein said operations further comprise generating a PWM gating signal to control said switching voltage regulator and transitioning said selective coupling in synchronization with said PWM gating signal.

23. The non-transitory computer-readable storage medium of claim 20, wherein said operations further comprise coupling said switching voltage regulator between said input voltage port and said output voltage port in response to determining that a current through a load coupled to said output voltage port exceeds a first pre-determined threshold.

24. The non-transitory computer-readable storage medium of claim 23, wherein said operations further comprise coupling said passive voltage regulator between said input voltage port and said output voltage port in response to determining that a current through a load coupled to said output voltage port is below said first pre-determined threshold.

25. The non-transitory computer-readable storage medium of claim 20, wherein said operations further comprise coupling said passive voltage regulator between said input voltage port and said output voltage port in response to determining that said ratio exceeds said second pre-determined threshold.

26. The non-transitory computer-readable storage medium of claim 20, wherein said operations further comprise coupling said passive voltage regulator between said input voltage port and said output voltage port in response to detecting the absence of a system clock signal.

27. The non-transitory computer-readable storage medium of claim 20, where said operations further comprise selectively coupling, by said controller circuit, one of said passive regulator circuit and said switching regulator circuit between said input voltage port and said output voltage port upon a cold boot up.

\* \* \* \* \*